Oct. 9, 1923.
M. C. MERRILL
MEASURING RULE
Filed May 1, 1922
1,469,944
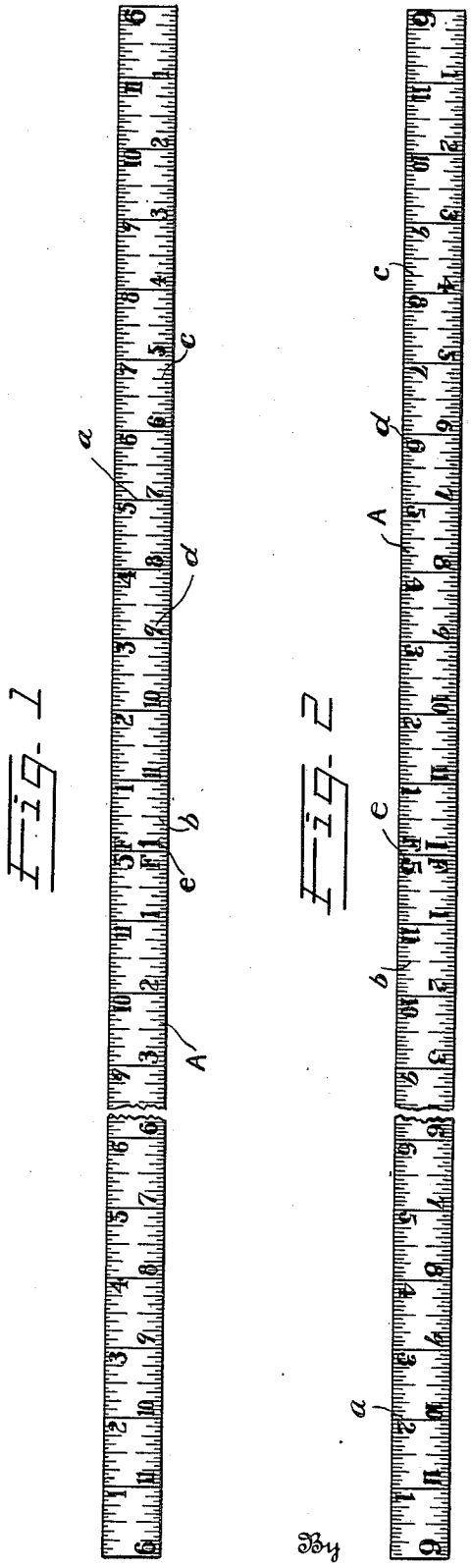
Inventor
Moses C. Merrill
By Watson E. Coleman  Attorney Patented Oct. 9, 1923.

1,469,944

UNITED STATES PATENT OFFICE.

MOSES C. MERRILL, OF BUXTON CENTER, MAINE.

MEASURING RULE.

Application filed May 1, 1922. Serial No. 557,709.

*To all whom it may concern:*

Be it known that I, MOSES C. MERRILL, a citizen of the United States, residing at Buxton Center, in the county of York and State of Maine, have invented certain new and useful Improvements in Measuring Rules, of which the following is a specification, reference being had to the accompanying drawings.

This invention relates to rules such as used by carpenters and the like and which are divided into inches and fractions thereof, and more particularly to rules having a length greater than two feet.

The general object of the invention is to provide a rule of this character which is so marked that it will read in feet, inches, and fractions of an inch from either end.

A further object is to provide a rule which is so marked with inches and fractions of inches as to insure quick and accurate measuring.

The long rule which is most commonly used by nearly all mechanics is the foldable or "zigzag" rule, that is a rule composed of pivoted sections which is folded up into a relatively small compass, this being the cheapest form of long rule on the market. This rule is so marked, however, that the figures are either upside down or else measurements have to be taken from the wrong end or the rule must be turned end for end. Furthermore, the rule is so constructed that when it is turned the wrong way measurements cannot be taken in feet and inches. This method of measuring saves a lot of time when two men are working together and one has a short rule and the other a long one. Furthermore, the rule should be so made that the figures are relatively large as otherwise, with mechanics' rules, the figures are liable to become filled or covered with dirt and be rather difficult to read.

The object of my invention is to avoid the objections heretofore stated by the provision of a rule which, if either end is open and the figures happen to be inverted, may be turned over and the figures are indicated right side up and can be read from either end.

A further object is to provide a rule wherein the measurements are given in feet and inches, thus avoiding the objection incident to other rules that it is necessary to reduce inches to feet and inches in a great many cases, this taking time and making mistakes likely.

A still further object is to indicate by the placing of the foot figures whether the figures are to be read from the right or the left end of the rule.

Another object is to provide a rule, both edges of which are provided with division marks, these marks indicating inches and fractions of an inch, one of the edges of the rule reading from right to left, while the other reads from left to right.

My invention is illustrated in the accompanying drawing, which shows one end of a six-foot rule.

In these drawings:—

Figure 1 is a view of one face of a portion of a six-foot rule;

Figure 2 shows the other face of the same portion of the rule, in other words the two figures show opposite faces of the same portion of the rule.

Referring to these drawings, A indicates the rule, which may be made in foldable sections or not, as desired, or may be made of sections which slide together, and in these drawings I have indicated only a portion of a six-foot rule, the middle portion being omitted.

Extending across the rule on the opposite side face thereof are the inch lines $a$. These naturally occur at intervals of one inch and these inch spaces are divided by the half-inch marks $b$, these spaces in turn being divided by the quarter-inch marks $c$, and these divided into $\frac{1}{8}''$ spaces or smaller by $\frac{1}{8}$ and $\frac{1}{16}$ marks. These inch marks extend entirely across the rule. The half-inch marks are preferably $\frac{1}{4}''$ long, the quarter marks are $\frac{3}{16}''$ long, and the eighth marks are $\frac{1}{8}''$ long. These marks are duplicated on opposite edges of the same face of the rule and both faces of the rule are alike. Along one edge of the rule inch designations $d$ occur, 3, 4, 5, 6, 7, 8, etc. At every foot, feet designations $e$ occur, accompanied by the letter F. The inch designations are disposed inward from the edge of the rule and are smaller than the foot designations, which are made in rather large figures. These foot designations are placed between the inch line $a$ and that end of the rule from which the foot designations are read.

Thus, for instance, in reading from left to right, the inch designations are placed on the left hand side of the inch line $a$ with the letter F on the opposite side of the line.

On the opposite edge margin of the rule the inches and feet read from right to left, and in that case the inch numbers or designations are placed on the right hand side of the inch lines with the letter F on the left hand side of the same lines. The opposite faces of the rule are marked alike so that the rule may be used with either face upward and with either end toward the left without any difficulty.

It will be seen that all the figures are large enough to see accurately as far off as one can hold the rule. Inasmuch as the foot figures are a little larger than the inch figures and are preferably printed in red ink, while all the other figures are black, quickness and accurate reading are assured. The figure 9, of course, should be so made that it will not be mistaken for an inverted 6. By placing the letter F on the opposite side of the inch line but in conjunction with the foot numeral or figure, it is obvious that a mistake in reading the rule is rendered impossible. Both edges have division marks, which is an advantage over other rules. The figures may be made large so as to be easily read and not become obscured by dirt.

It will be seen that with this rule if either end is open and the rule happens to be inverted, the rule simply has to be turned over and the figures are right side up and can be read from either end. Second, the measurements are given in feet and inches, whereas in all other long rules it is necessary to reduce inches to feet and inches in a great many cases, which takes time and makes for likelihood of mistakes. As before remarked, this system of numbering and marking rules may be used consisting of a straight piece of material not foldable, or on a foldable rule, or on rules composed of sliding sections.

I claim:—

1. A rule of the character described divided into inches, each inch being separated from an adjacent inch by a line extending transversely across the rule, each margin of the rule having short lines indicating fractions of an inch, each inch line being associated on opposite edges of the rule with numerals indicating inches, the numerals reading on one margin of the rule from right to left and on the opposite margin of the rule from left to right, the inch line for each twelfth inch being associated with a numeral indicating feet on each margin of the rule, the inch numerals and the foot numerals on one margin of the rule reading from right to left and upon the opposite margin of the rule reading from left to right, both sets of numerals reading from the same edge of the rule, the numerals on each edge of the rule being disposed between the inch line with which they are associated and that end of the rule from which the numerals are to be read.

2. A rule of the character described divided into inches, each inch being separated from an adjacent inch by a line extending transversely across the rule, each margin of the rule having short lines indicating fractions of an inch, each inch line being associated on opposite edges of the rule with numerals indicating inches, the numerals reading on one margin of the rule from right to left and on the opposite margin of the rule from left to right, the inch line for each twelfth inch being associated with a numeral indicating feet on each margin of the rule, the inch numerals and the foot numerals on one margin of the rule reading from right to left and upon the opposite margin of the rule reading from left to right, both sets of numerals reading from the same edge of the rule, the numerals on each edge of the rule being disposed between the inch line with which they are associated and that end of the rule from which the numerals are to be read, each foot numeral being accompanied by the letter F and being larger than the inch numerals.

In testimony whereof I hereunto affix my signature.

MOSES C. MERRILL.